(12) United States Patent
Zhang et al.

(10) Patent No.: US 9,777,674 B2
(45) Date of Patent: Oct. 3, 2017

(54) INJECTOR PLATE FOR A ROCKET ENGINE

(71) Applicant: Deepak Atyam, Cerritos, CA (US)

(72) Inventors: Teddy Zhang, Cedar Rapids, IA (US);
Hung Chun Yang, Arcadia, CA (US);
Colin Miyamoto, Los Angeles, CA (US)

( * ) Notice: Subject to any disclaimer, the term of this patent is extended or adjusted under 35 U.S.C. 154(b) by 560 days.

(21) Appl. No.: 14/329,342

(22) Filed: Jul. 11, 2014

(65) Prior Publication Data
US 2015/0240746 A1 Aug. 27, 2015

Related U.S. Application Data

(60) Provisional application No. 61/945,050, filed on Feb. 26, 2014.

(51) Int. Cl.
*F02K 9/52* (2006.01)

(52) U.S. Cl.
CPC .................... *F02K 9/52* (2013.01)

(58) Field of Classification Search
CPC ......................................................... F02K 9/52
See application file for complete search history.

(56) References Cited

U.S. PATENT DOCUMENTS

| | | | | |
|---|---|---|---|---|
| 2,733,570 A | * | 2/1956 | MacPherson | F02K 9/52 239/557 |
| 2,753,687 A | * | 7/1956 | Wissley | F02K 9/52 239/548 |
| 2,808,701 A | * | 10/1957 | Lewis | F02K 9/52 239/543 |
| 2,928,236 A | * | 3/1960 | Kircher | F02K 9/52 239/422 |
| 2,929,208 A | * | 3/1960 | Schultz | F02K 9/52 60/258 |
| 2,940,259 A | * | 6/1960 | Mantler | F02K 9/52 60/258 |
| 2,975,591 A | * | 3/1961 | Fox | F02K 9/52 239/431 |

(Continued)

OTHER PUBLICATIONS

Gannon, M., "3D-Printed Rocket Engine Built by Students Passes Big Test", Oct. 8, 2013 [http://www.space.com/23107-3d-printed-rocket-engine-student-video.html accessed on Dec. 22, 2016.].*

(Continued)

*Primary Examiner* — Lorne Meade
(74) *Attorney, Agent, or Firm* — Erik Vieira

(57) ABSTRACT

An injector plate for a rocket engine assembly, for connection to the rocket engine assembly having a body with a fuel manifold that contains a fuel entry and a fuel passage ring encircling an axis, that fuels recirculation passages extending between portions of the fuel passage ring and fuel element passages, each fuel element passage extending to fuel outlets. The injector plate also has an oxidizer with an internal primary oxygen passage, secondary oxygen passages branching from the primary oxygen passage at an internal portion of the body to oxidizer outlets and tertiary oxygen passages branching from the secondary oxygen passages at an internal portion of the body to the oxidizer outlets. The fuel outlets and the oxidizer outlets are arranged to form outer and inner element grouping patterns.

10 Claims, 10 Drawing Sheets

(56) References Cited

U.S. PATENT DOCUMENTS

| | | | | |
|---|---|---|---|---|
| 2,982,097 A * | 5/1961 | Hull | F02K 9/52 | 60/258 |
| 3,000,184 A * | 9/1961 | Fish | F02K 9/52 | 239/426 |
| 3,001,365 A * | 9/1961 | Kellogg | F02K 9/52 | 60/258 |
| 3,132,481 A * | 5/1964 | Hasbrouck | F02K 9/52 | 60/258 |
| 3,137,445 A * | 6/1964 | Barrett | F02K 9/52 | 239/423 |
| 3,141,301 A * | 7/1964 | Whitney | F02K 9/52 | 60/39.461 |
| 3,200,589 A * | 8/1965 | Mower | F02K 9/52 | 239/422 |
| 3,221,499 A * | 12/1965 | Hasbrouck | F02K 9/52 | 239/424 |
| 3,397,537 A * | 8/1968 | Green, Jr. | F02K 9/52 | 60/258 |
| 3,605,408 A * | 9/1971 | McGough | F02K 9/52 | 239/553.3 |
| 3,625,435 A * | 12/1971 | Mitchell | F02K 9/52 | 239/422 |
| 3,662,960 A * | 5/1972 | Mitchell | F04F 5/463 | 239/400 |
| 3,667,232 A * | 6/1972 | Mitchell | F02K 9/52 | 60/258 |
| 3,675,425 A * | 7/1972 | Scannell | F02K 9/52 | 239/404 |
| 3,780,952 A * | 12/1973 | Huang | F02K 9/52 | 239/424.5 |
| 4,586,226 A * | 5/1986 | Fakler | C25D 1/02 | 164/46 |
| 4,621,492 A * | 11/1986 | von Pragenau | F02K 9/52 | 239/132.5 |
| 4,707,982 A * | 11/1987 | Wagner | F02K 9/52 | 60/258 |
| 5,161,379 A * | 11/1992 | Jones | F23D 14/78 | 239/132.5 |
| 5,404,715 A * | 4/1995 | Vuillamy | F02K 9/48 | 60/257 |
| 5,417,049 A * | 5/1995 | Sackheim | B64G 1/401 | 244/169 |
| 5,603,213 A * | 2/1997 | Sion | F02K 9/52 | 239/424 |
| 5,660,039 A * | 8/1997 | Sion | F02K 9/52 | 239/424 |
| 5,771,579 A * | 6/1998 | Farhangi | F02K 9/52 | 29/890.01 |
| 5,983,626 A * | 11/1999 | Stahn | F02K 9/52 | 239/562 |
| 6,050,085 A * | 4/2000 | Mayer | F02K 9/52 | 239/424 |
| 6,116,020 A * | 9/2000 | Cornelius | F02K 9/52 | 60/258 |
| 6,351,939 B1 * | 3/2002 | Buddenbohm | F02K 9/52 | 60/204 |
| 6,397,580 B1 * | 6/2002 | Stechman, Jr. | F02K 9/52 | 60/204 |
| 8,763,362 B1 * | 7/2014 | Trinh | F02K 9/52 | 239/87 |
| 9,404,441 B2 * | 8/2016 | Brown | F02K 9/52 | |
| 9,482,184 B2 * | 11/2016 | Indersie | F02K 9/52 | |

OTHER PUBLICATIONS

Szondy, D., "UCSD Students Test Fire 3D-Printed Metal Rocket Engine", Oct. 12, 2013 [http://newatlas.com/3d-printed-rocket-seds/29306 accessed on Dec. 22, 2016.].*

Zhang, T. and Miyamoto, C., "3D Printing: A Cost Effective and Timely Approach to Manufacturing of Low-Thrust Engines", AIAA-2014-3502, 50th AIAA/ASME/SAE/ASEE Joint Propulsion Conference, Cleveland, OH, Jul. 28-30, 2014, pp. 1-23.*

* cited by examiner

SECTION A-A

SECTION B-B

Section C-C

DETAIL G

Section E-E

DETAIL F

INJECTOR PLATE FOR A ROCKET ENGINE

CROSS-REFERENCE TO RELATED APPLICATION

This application claims the benefit of and priority to U.S. Provisional Patent Application 61/945,050, filed on Feb. 26, 2014, the disclosure of which is incorporated by reference herein in its entirety.

FIELD OF THE INVENTION

The present invention relates to novel designs for three-dimensionally printed rocket engine components, in particular, injector plates for rocket engines, which are otherwise infeasible to manufacture by conventional methods.

BACKGROUND OF THE INVENTION

Currently, there is a high demand to put various small payloads into space, a majority of which are small satellites. As modern microprocessors become smaller, faster and less expensive every year, the ability to shrink satellite technology into a package weighing as little as one kilogram (Picosats) becomes increasingly feasible. Today, there are numerous organizations, including universities, research groups and the military, which have developed small satellite technology but need a realistic way to launch the satellites into orbit.

Time and cost are among the key restrictions to launching small satellites into space. Currently, existing solutions involve "piggybacking" smaller payloads onto larger launch vehicles already carrying larger payloads. This forces the party launching the small satellite to conform their launch schedule to when the customer with the larger primary payload decides to launch. In addition, since there are only a few launches per year, there is a long list of parties waiting to launch their smaller payloads and satellites into space.

Developing rockets for space launches has historically been too expensive and beyond the reach of other than very large enterprises. Estimates for launching satellites into orbit can cost anywhere between the tens of millions to hundreds of millions of dollars. Part of this exorbitant cost comes from the developmental expenses for the main component of a rocket—the rocket engine. Fabricating a rocket engine, especially the injector plate, requires intricate and precise manufacturing methods resulting in large expenses. 3-D printing methods are an alternative to traditional manufacturing methods; however, with the use of 3-D printing technology, complications arise from shrinkage, which affects controlling miniaturized orifices and embedded passageways.

Accordingly, it is desirable to develop novel rocket engine component configurations, in particular, injector plates, which may utilize 3-D printing to manufacture smaller sized rockets for use in putting small payloads into space that overcomes the aforementioned deficiencies. Embodiments of the invention, individually and/or collectively, provide for at least an injector plate that addresses these and other problems associated with manufacturing an injector plate for a rocket engine assembly.

BRIEF SUMMARY OF THE INVENTION

The following detailed description together with the accompanying drawings will provide a better understanding of the nature and advantages of the present invention.

Many embodiments are related to an injector plate for a rocket engine assembly where the injector plate has a body elongated along an axis between an entry end and an exit end. The exit end is configured to form a portion of a combustion chamber for a rocket engine assembly and the body has a mounting flange extending diametrically about the axis for connection to the rocket engine assembly. The body has a fuel manifold comprising a fuel passage ring encircling the axis and, in fluid communication with a fuel inlet, a plurality of fuel recirculation passages, each fuel recirculation passage extending between portions of the fuel passage ring, and a plurality of fuel element passages, each fuel element passage extending to a plurality of fuel outlets at the exit end from the plurality of recirculation passages. The body has an oxidizer comprising a primary oxygen passage elongated along the axis between a primary oxidizer entrance at the entry end of the oxidizer body and an internal portion of the oxidizer body, a plurality of secondary oxygen passages branching from the primary oxygen passage to a plurality of oxidizer outlets at the exit end, and a plurality of tertiary oxygen passages branching from the secondary oxygen passage at an internal portion of the oxidizer body to the plurality of oxidizer outlets at the exit end. The plurality of fuel outlets and the plurality of oxidizer outlets are arranged at the exit end to form a plurality of outer element groupings and plurality of inner element groupings.

In many embodiments, each of the plurality of secondary passages branches into at least two tertiary oxidizer passages extending from the secondary passage to the oxidizer outlets. In many embodiments, at least two tertiary oxidizer passages extend parallel to the axis. In many embodiments, a plurality of film cooling passages extend from the fuel passage ring to a plurality of cooling outlets at the exit end.

In many embodiments, the plurality of oxidizer outlets and plurality of fuel element passages are arranged in a linear pattern to form a plurality of element groupings and wherein each of the plurality of element groupings comprises oxidizer and fuel outlets in the order of a fuel outlet, an oxidizer outlet, another oxidizer outlet and then another fuel outlet. In many embodiments, each inner grouping comprises fuel outlets that extend from different fuel passage rings. In many embodiments, the fuel element passages extend toward the oxidizer outlets in the exit end direction at an angle of 40° with respect to the body axis. In many embodiments, the fuel element passages extending to the outer element groupings extend from adjacent recirculation passages and the fuel element passages extending to the inner element groupings extend from a single recirculation passage.

In many embodiments, the primary oxygen passage terminates in a curved shaped cup. In many embodiments, the fuel inlet is angled in the radial direction about the axis.

Further understanding of the nature and the advantages of the embodiments disclosed and suggested herein may be realized by reference to the remaining portions of the specification and the attached drawings.

DETAILED DESCRIPTION OF THE INVENTION

Figure 1:
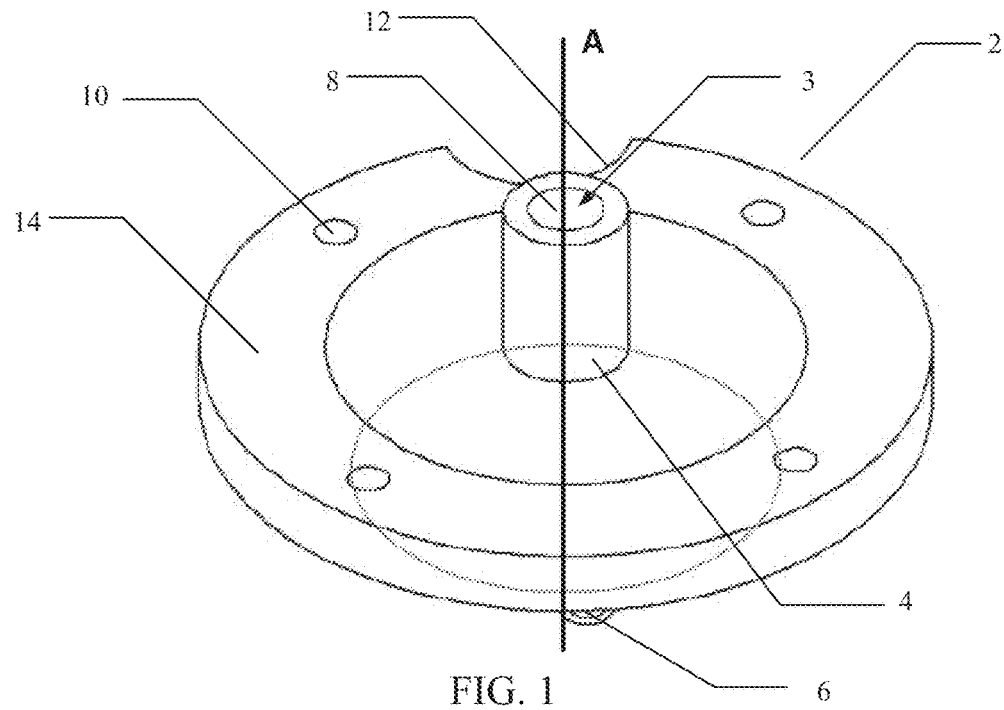
FIG. 1 is a top perspective view of the injector plate according to some embodiments.

Embodiments of the invention are generally directed to an injector plate for use in a rocket engine assembly where the injector plate may be manufactured using 3-D printing technology to increase cost efficiency and allowing for smooth embedded passages. Because 3-D printing is an additive process, where successive layers of material are formed in different shapes, as opposed to subtractive, which removes material to produce a product. Distinct internal configurations can be created that were previously extremely difficult or impossible to manufacture.

Injector plates provide a mechanism for ejecting liquid oxygen and liquid rocket fuel from outlets into a combustion chamber. Once the correct oxygen fuel combination is ejected into the combustion chamber, the combination is ignited to create the thrust for the rocket engine. Embodiments of the invention can produce around 100 lbs of thrust where the exit velocity of gas and fuel is in the range of 3 km/s and the combustion pressure is nearly 300 psi at 1600° K.

The fuel and oxygen composition as well as the physical manner in which each are ejected from the injector plate are important factors to the operation of a rocket engine and for minimizing inefficiencies inherent in rocket engine combustion. FIGS. 1-5 illustrate the exterior configuration of a preferred embodiment of one such injector plate. FIGS. 6-12, described later, illustrate interior fuel and oxygen passages of the injector plate.

As seen in FIGS. 1-6, the injector plate 2 has an oxidizer body 4, which has a primary oxidizer passage 8 with its entrance shown at the entry end 3 for passing liquid oxygen into the injector plate 2. The primary oxidizer passage 8 feeds along an axis A into the center of the body 4 of the injector plate 2 from the entry end 3 towards an exit end 5. At an exit end 5, the body 4 has a bottom face 7 that in connection with separate combustion chamber walls (not shown), forms a portion of a combustion chamber for the rocket engine assembly. Encircling the body 4 is a mounting flange 14 extending diametrically about the axis A for connection to the rocket engine assembly. The mounting flange 14 has four mounting holes 10, shown in this particular embodiment; however, more or less can be used. The outer diameter of the mounting flange 14 has a regenerative cooling pipe cutout 12 to provide clearance for a regenerative cooling system pipe for the rocket engine, keeping the rocket engine assembly compact. A fuel inlet 6 penetrates the side of the injector plate body 4 through a fuel entrance pipe 9, which extends in a plane transverse to the injector plate axis. Although being perpendicular, the entrance pipe 9 and fuel inlet 6 are curved and angled radially about the axis A to encourage circular flow into an internal circular fuel ring 32, shown and described later, to reduce turbulent flow at the fuel inlet 6 and to maintain equal pressure around the entire fuel ring 32.

Figure 2:
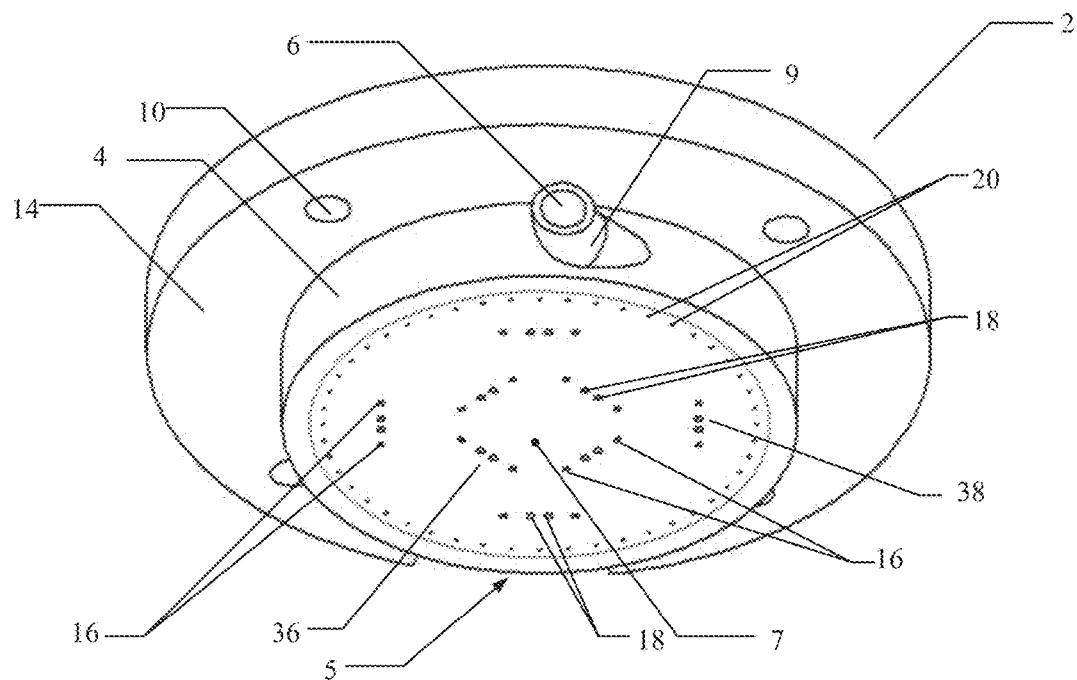
FIG. 2 is a bottom perspective view of the injector plate shown in FIG. 1.
Figure 3:
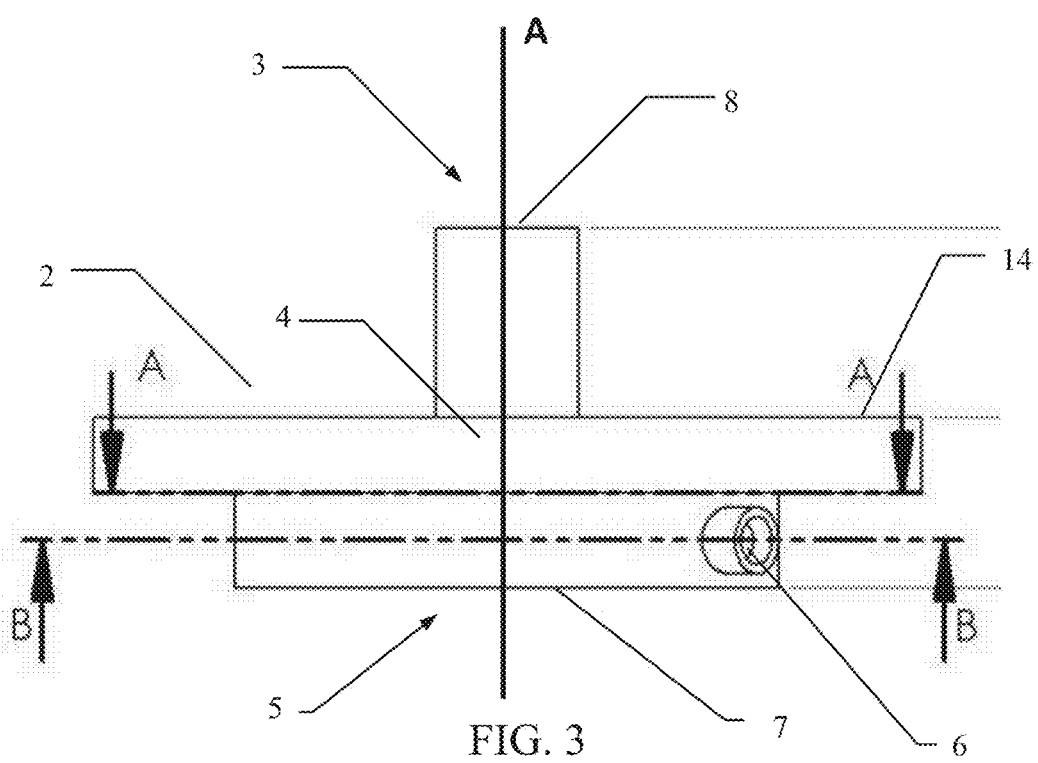
FIG. 3 is a side elevation view of the injector plate shown in FIG. 1.
Figure 4:
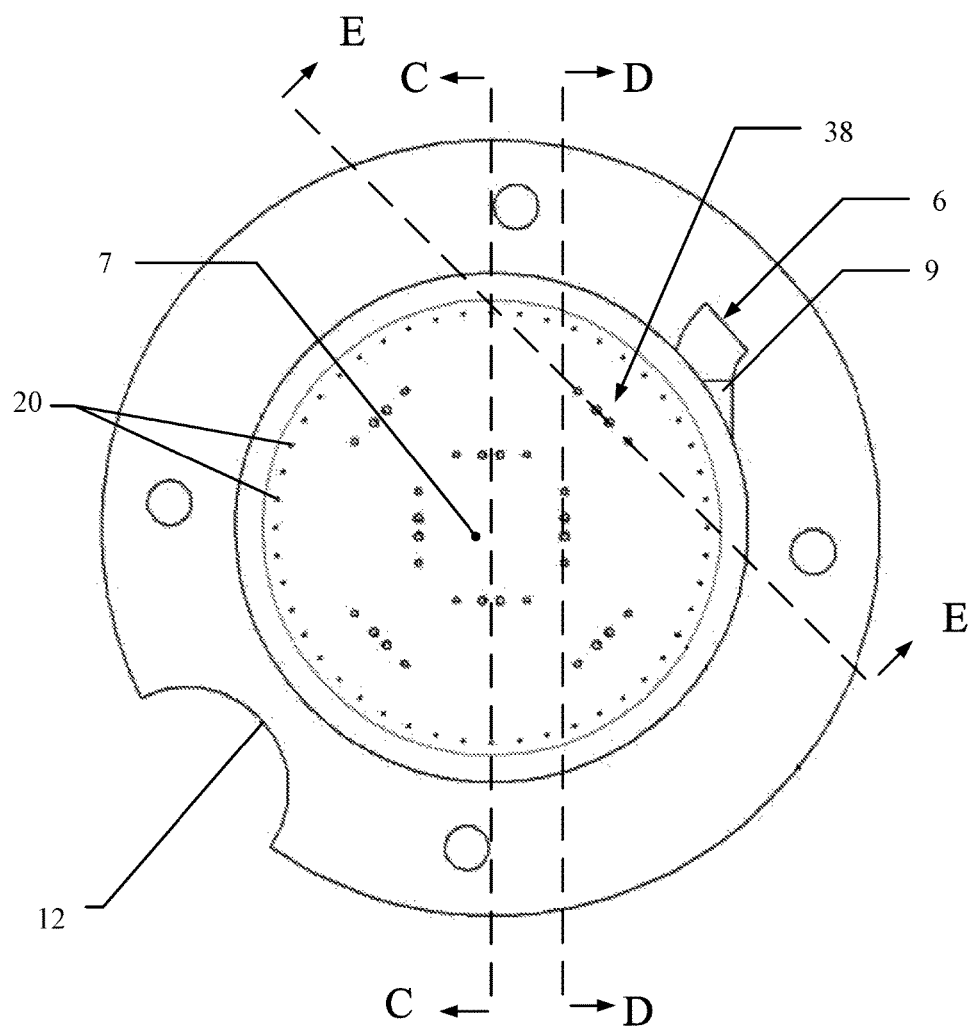
FIG. 4 is a bottom plan view of the injector plate shown in FIG. 1.
Figure 5:
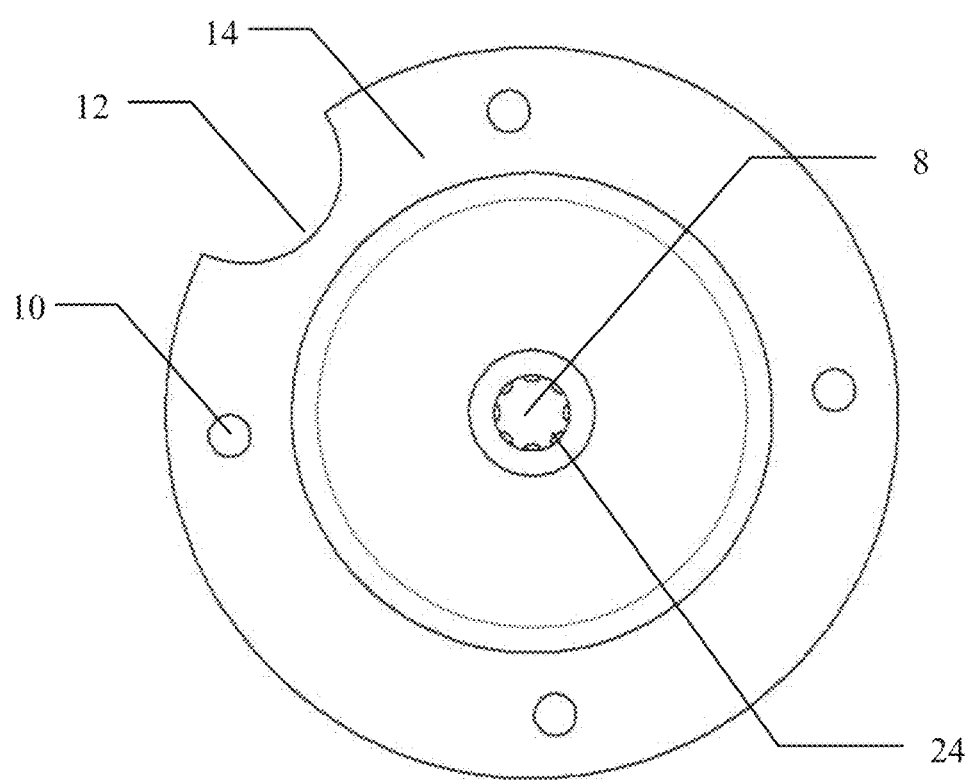
FIG. 5 is a top plan view of the injector plate shown in FIG. 1.

FIG. 2 and FIG. 4 show fuel outlets 16 and oxygen outlets 18 in a pattern on the bottom face of the injector plate body 4. Two fuel outlets 16 and two oxygen outlets 18 comprise an element. There are both inner elements 36 and outer elements 38 each of which form F-O-O-F element pattern on the bottom face 7 of the injector plate body 4. The F-O-O-F pattern is named after the fuel outlet 16 and oxygen outlet 18 patterns because the outlets are arranged in a row of a fuel-oxidizer-oxidizer-fuel outlet. The element pattern geometry provides the necessary mass flow rate of the fuel and liquid oxygen needed to create a thrust of at least 445 Newtons in the rocket. The element pattern configuration also produces the necessary change in pressure between the injector inlets at the primary passage 8, the fuel inlet 6, the fuel outlets 16, and the oxygen outlets 18, as well as internal passage sizes.

Figure 6:
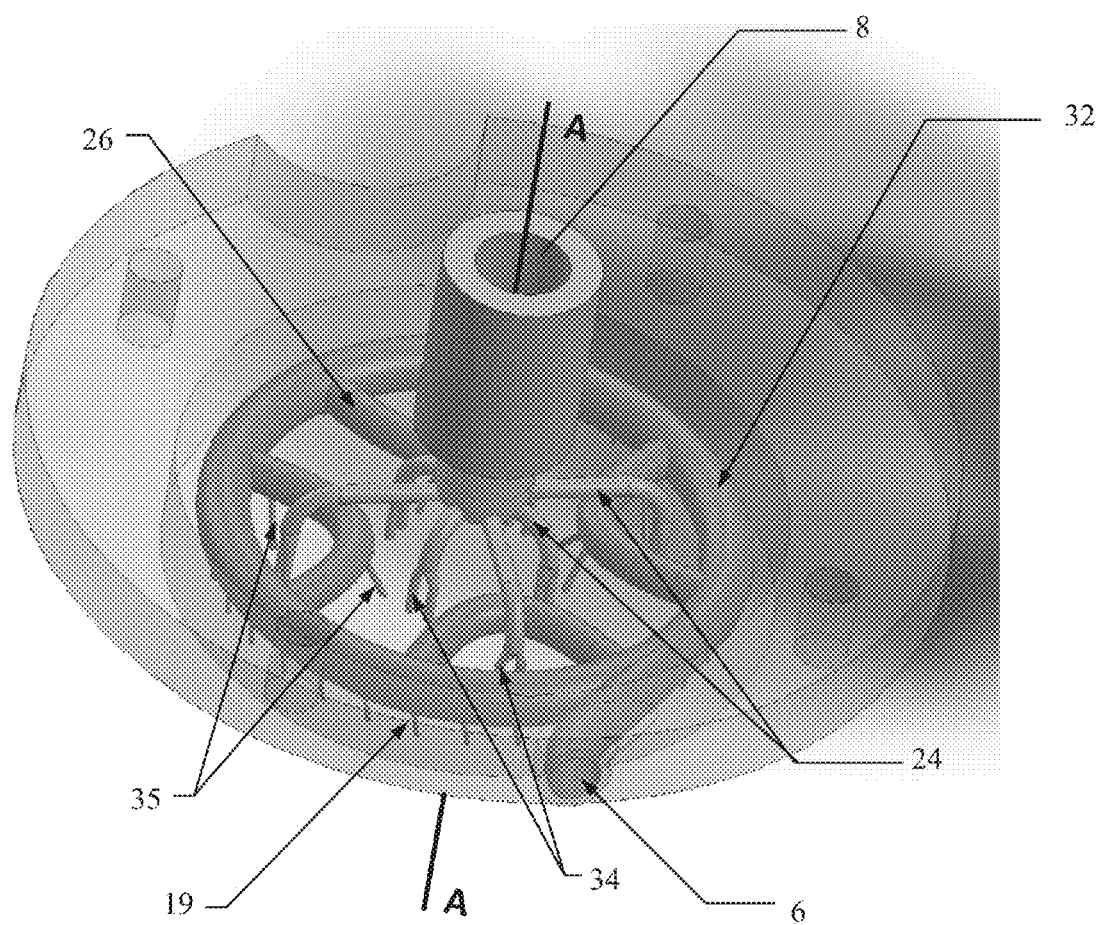
FIG. 6 is a 3-D rendering showing the internal portions and the configuration of the injector plate shown in FIG. 1.
Figure 7:
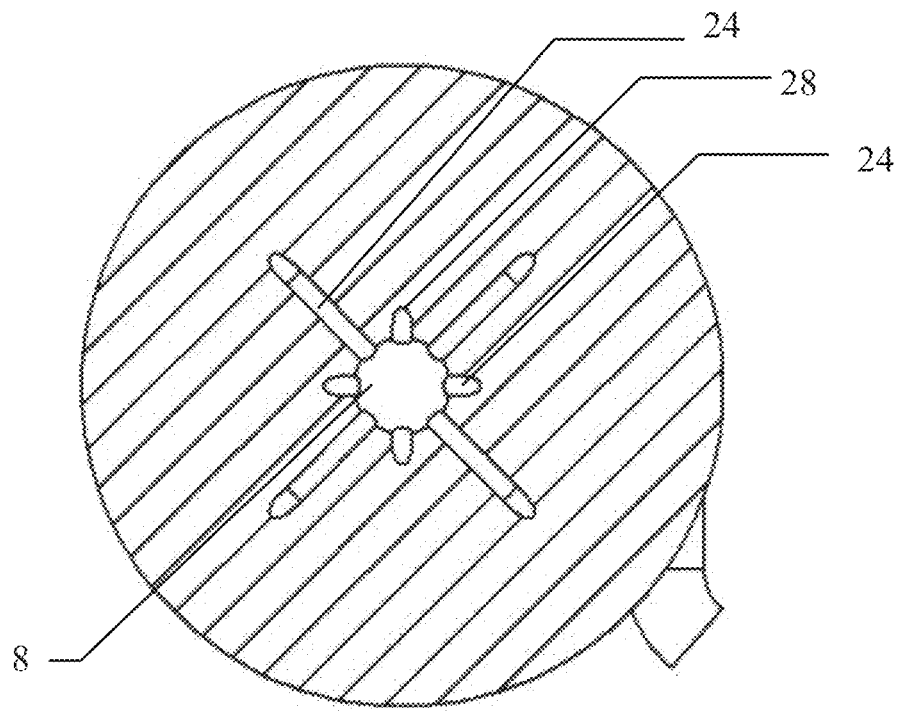
FIG. 7 is a cross-section view A-A of the injector plate shown in FIG. 3.
Figure 8:
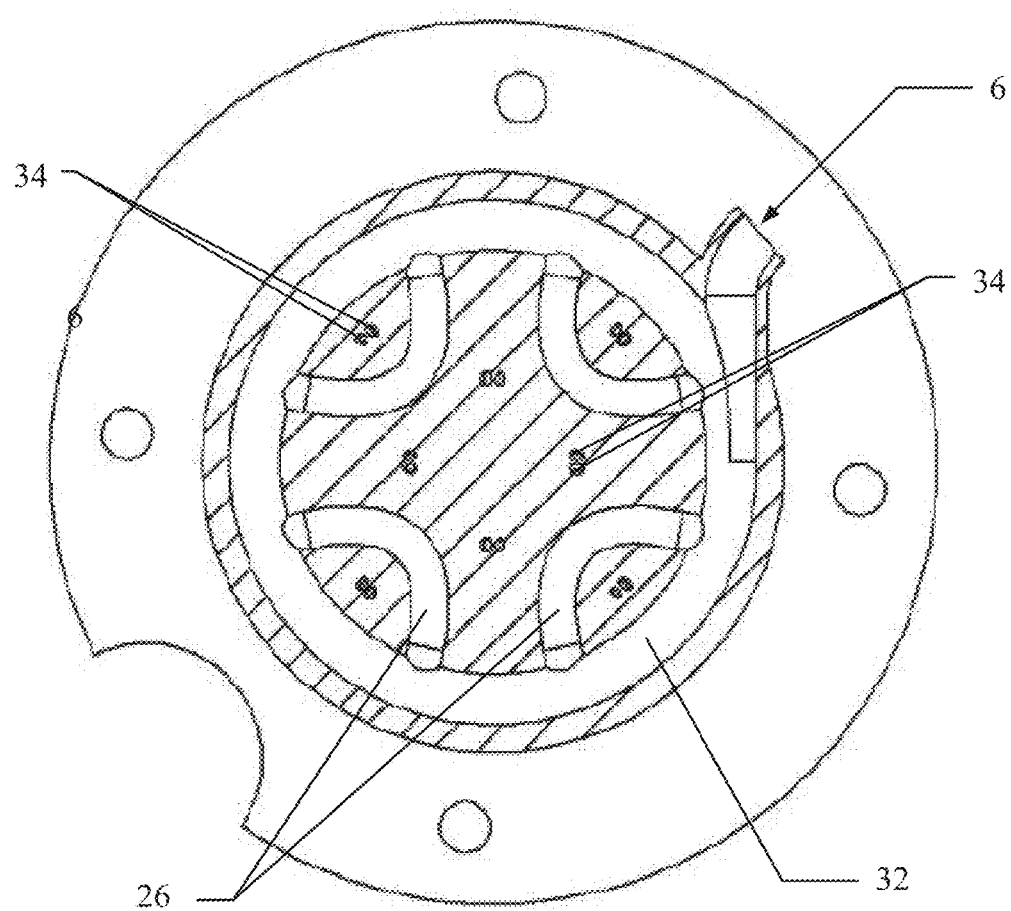
FIG. 8 is a cross-section view B-B of the injector plate shown in FIG. 3.
Figure 9:
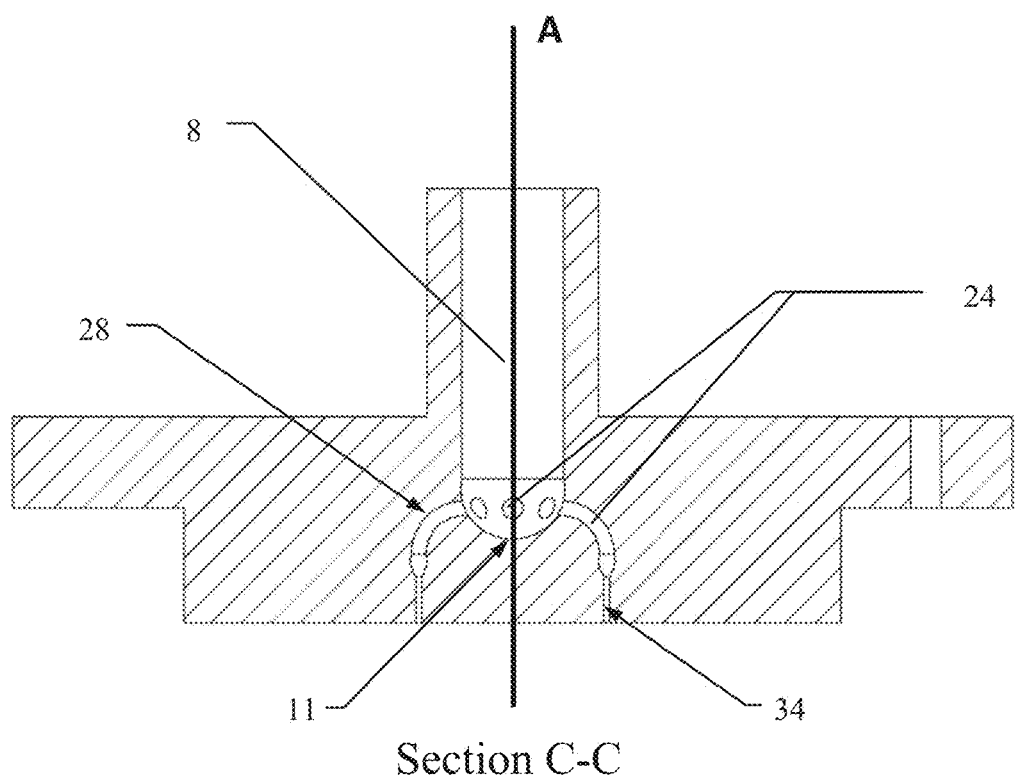
FIG. 9 is a cross-section view of Section D-D view of the injector plate shown in FIG. 4.
Figure 10:
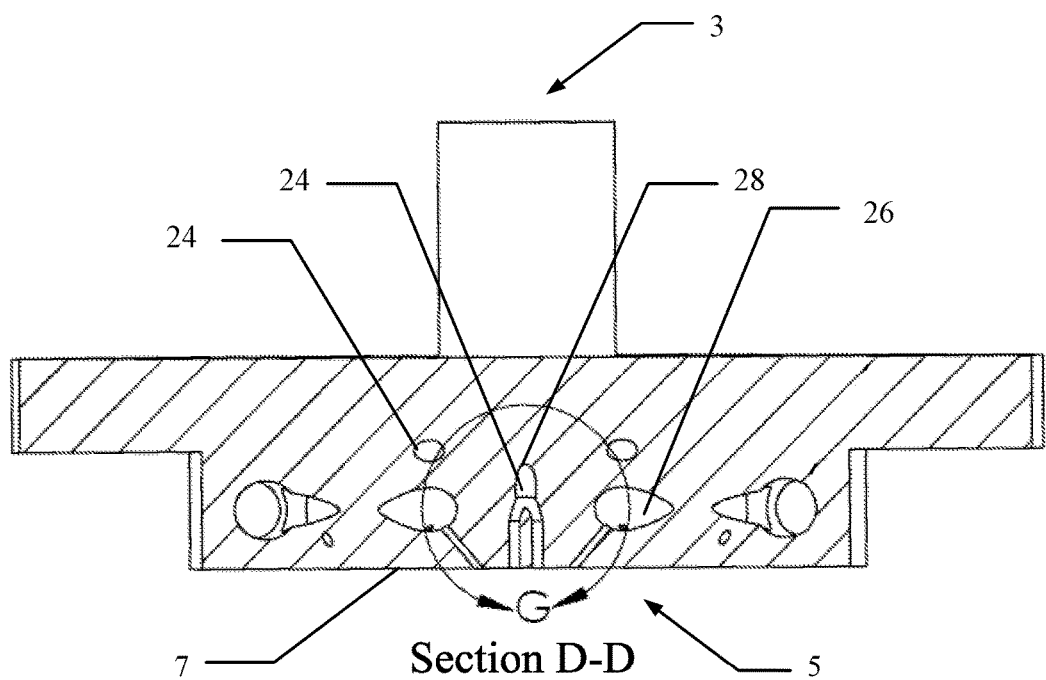
FIG. 10 is a cross-section view of Section E-E view of the injector plate shown in FIG. 4.
Figure 11:
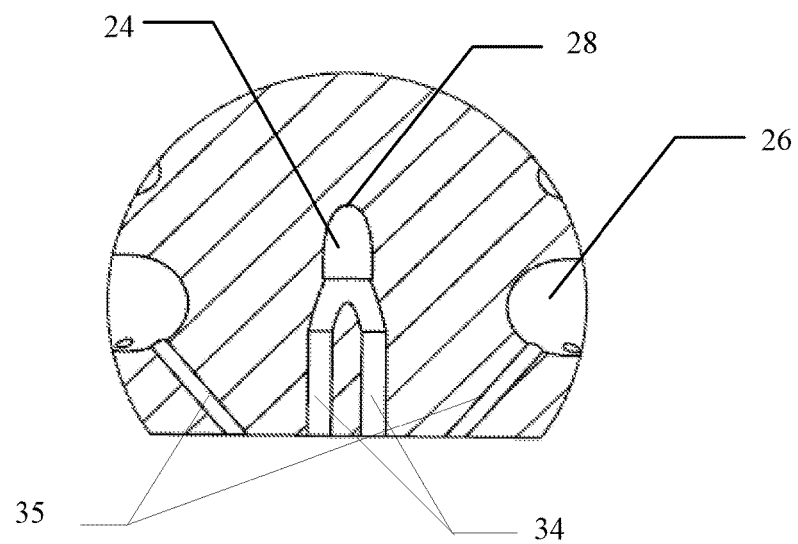
FIG. 11 is a detail section of the injector plate shown in FIG. 10.
Figure 12:
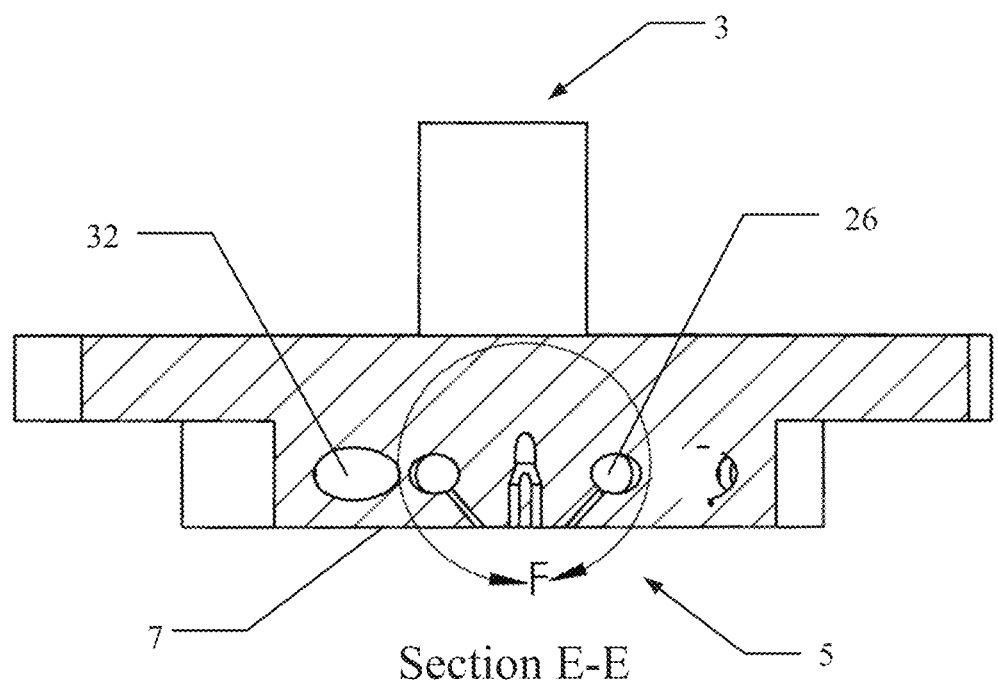
FIG. 12 is a cross-section view of Section E-E view of the injector plate shown in FIG. 4.
Figure 13:
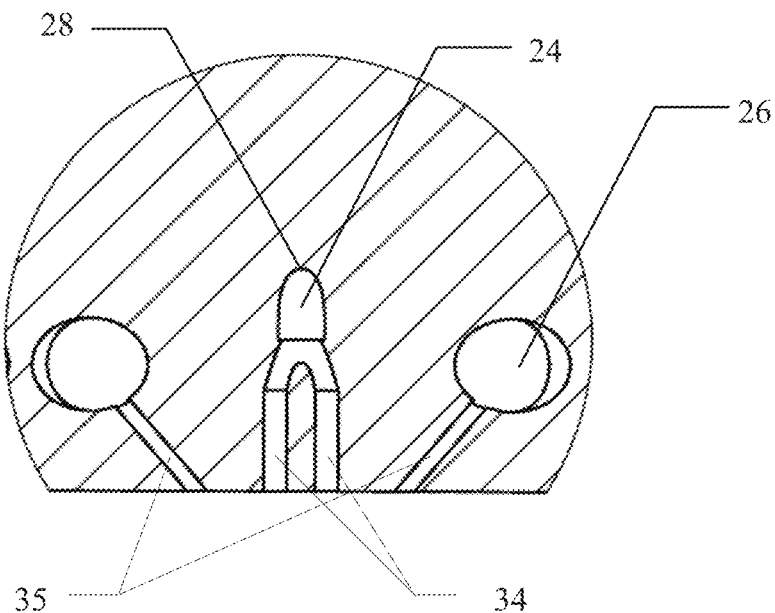
FIG. 13 is a detail section of the injector plate shown in FIG. 12.

FIGS. 7-12 illustrate the interior passages through which the oxygen and fuel travel through in reaching the fuel outlets 16 and oxygen outlets 18. Liquid oxygen enters the injector plate 2 through the primary oxidizer passage 8. As seen in FIG. 9, the primary oxidizer passage 8 terminates inside the body 4 in a semi-spherical shaped cup 11 to minimize splashing of the liquid oxygen when liquid oxygen first enters the oxidizer. Near the termination of the primary oxidizer passage 8, eight small secondary passages 24 extend transversely from the primary passage 8 and then bend towards the oxidizer exits. The bend 28 in the primary passage 8 is shown in FIGS. 6 and 8-12. As seen in FIG. 6, four of the secondary passages 24 extend further diametrically than the other four secondary passages 24. This creates the inner elements 36 and outer elements 38 configuration shown in FIGS. 2 and 4. Each of the secondary passages 24 extends from around the primary passage 8 at an equal height to ensure equal pressure to each of the various oxidizer outlets. After the bend 28 in the secondary passages 24, each of the secondary passages 24 branches into two tertiary passages 34 before exiting the injector plate 2 at the bottom face 7 at the oxidizer outlets 18 forming the two oxidizer outlets for an element. This branching minimizes passageways within the injector plate and retains the most structural integrity possible. The branching of the secondary passages 24 into the tertiary passages 34 is curved smoothly to minimize turbulence so that oxygen flow is evenly ejected from each oxidizer outlet 18. The tertiary oxidizer passages 34 extend coaxially with the body axis down toward the exit end 3 of the injector plate 2 to the oxidizer outlets 16.

As best illustrated in FIG. 8, fuel enters the injector plate 2, by way of the fuel inlet 6, into a fuel ring 32 that encircles the axis of the body 4. Forty-eight film cooling passages extend from the fuel ring 32 to the outlets 20 at the bottom face 7 of the body 4 as part of a cooling system as described later. Four recirculation passages 26 are equally spaced around the inner side of the fuel ring 32 and extend between two different points of the fuel ring 32. Four fuel element passages 35 extend from each of the four "U" shaped recirculation passages 26. Two of the four fuel element passages 35 are inner fuel element passages 35 and are arranged relatively furthest from the points where the recirculation passage 26 connects with the fuel ring 32. Two outer fuel element passages 35 are arranged to extend from the fuel ring near where the recirculation passages 26 connects with the fuel ring 32.

The inner elements 36 and outer elements 38 are created by virtue of the fuel and oxygen passages. All the fuel element passages 35 extend from the recirculation passages 26 out toward the exit end 5 of the injector plate 2 where they open to the fuel outlets 16 of the inner elements 36 and outer elements 38. Each inner element 36 has one fuel element passage 35 fed from a single recirculation passage 26 and the other fuel element passage 35 fed from an adjacent recirculation passage 26. This allows for the inner elements 36 to be offset at 45°, radially about the injector plate axis A, from the outer elements 38. Because each inner element 36 is fed from two different recirculation passages 26, it is important that each fuel element passage 35 has equal pressure. The large diameter used for the recirculation passages 26 as well as the circular flow of fuel through which the fuel ring 32 adequately maintains the equal pressure required. For outer elements 38, both fuel outlets 16 are fed by way of fuel element passages 35 from a single "U" shaped recirculation passage 26. The fuel elements passages 35 angle towards the tertiary oxidizer passages 34 at an angle of 40° from the injector plate bottom face 7.

The F-O-O-F element pattern, created by the fuel outlets 16 and oxidizer outlets 18, allows for maintaining the fuel to oxygen ratio for the rocket combustion keeping the oxidizer outlet size relatively similar to the fuel outlet size. A large difference in stream sizes between the fuel and oxidizer holes typically leads to poor mixing and atomization. By having two oxidizer outlets 18 and two fuel outlets 16, forming the F-O-O-F pattern, the fuel and oxidizer hole diameters are similar, leading to mixing characteristics having a high oxidizer to fuel ratio level while also avoiding wall compatibility issues.

In at least one embodiment, the oxidizer outlets 18 are about 0.9 mm in diameter. The approximate distance between the centers of the oxidizer outlets 18 is about 2 mm. The fuel outlets 16 have a diameter of about 0.6 mm and are configured so that the centers of the fuel outlets 16 are each about 3 mm from the oxidizer outlet 18 centers. This configuration causes the ejected fuel stream to interact with the adjacent oxidizer stream at a primary impingement point. Given the deflection of the oxidizer stream, given its interaction with the adjacent fuel stream, the two combined fuel-oxygen streams interact at a point beyond the primary impingement point to further combine.

The primary impingement point is about 3.575 mm from the injector plate bottom face 7. Given a mass flow rate of 0.005208 kg/s of fuel per hole and 0.01354 kg/s of oxidizer per hole, the primary impingement resultant velocity is about 18.64 m/s axially and 4.33 m/s radially with a resultant angle from the primary impingement of 76.92 degrees with respect to the body axis. Hence, the secondary impingement will occur at approximately 7.88 mm from the bottom face 7 of the injector plate 2. The resultant combined fuel-oxygen stream is coaxial with the injector plate axis with an approximate velocity of 18.16 m/s.

The injector plate 2 includes cooling elements having cooling element outlets 20 which are part of a greater regenerative cooling system of the rocket engine. The cooling elements extend from the fuel ring 32 toward the bottom face 7 of the injector plate 2 where they exit to cooling element outlets 20 as shown in FIGS. 2 and 4. The cooling elements are angled radially such that fuel streams exiting the forty-eight fuel outlets 20 streak the walls of the combustion chamber (not shown) spirally to cool the engine and concentrate the combustion towards the centerline of the combustion chamber. The cooling system feeds fresh fuel to a temperature critical throat of the combustion chamber and then feeds the fuel through rocket nozzle after passing through heat sink vanes to maximize surface area cooling, and finally re-feeding the regenerative cooled fuel into the injector plate at the fuel outlet.

Before entering the injector plate, fuel travels first through a jacket around the nozzle of the engine. It enters at the throat into a 6 mm diameter ring circumventing it. Since the throat is the hottest part of the engine and requires the most cooling, the relatively large volume ring is designed to circulate fuel around before leaving to cool the rest of the nozzle. The rest of the nozzle from the throat down features a jacket that allows a 1 mm thick layer of fuel to travel between it and the nozzle.

To improve the efficiency of the flow of fuel and oxygen within the passages of the injector plate 2, the injector plate 2 takes advantage of 3-D printing capabilities by utilizing smooth and circular passages. In that regard, sharp corners and edges of passages are smoothed and rounded to the extent possible. An entire rocket engine, including the injector plate 2 can be printed as a single piece using a single material such as Cobalt-Chromium. This eliminates numerous manufacturing difficulties faced by conventional fabrication methods and at least makes including a regenerative cooling system more cost effective.

In use, and as best illustrated in FIG. 6, liquid oxygen enters into the primary passage 8 from an oxygen source (not shown). The liquid oxygen, by way of pressure, is pushed through the primary passage 8 along axis A (i.e. in the downward direction in FIG. 6). The liquid oxygen runs into the semi-spherical shaped cup 11 at the end of the primary passage 8 where the shape of the cup is such that any back splashing of the liquid oxygen is reduced and the oxygen is able to more smoothly move into the secondary passages 24 branching off the sides of the primary passage 8. The liquid oxygen travels transversely through the secondary passages 24 through the bend 28 toward the oxygen outlets 18. After passing the bend 28 the oxygen travels into the tertiary passages 34 and then is ejected from the oxidizer outlets 18. In the embodiments shown in FIG. 6, the secondary passages 24 extend radially for different lengths before reaching the bend 28. The shorter secondary passages 24 exit at the inner outlet elements 36 and the longer secondary passages 24 exit at the outer outlet elements 38.

Liquid fuel enters the injector plate 2 by way of the fuel inlet 6, which is attached to a regenerative fuel cooling system (not shown). The fuel is pressurized and enters the fuel inlet 6, traveling into the fuel ring 32. The fuel encircles the fuel ring 32 and additionally circles through each recirculation loop 26. Part of the fuel travels through the cooling elements 19 and exits the cooling elements outlets 20 where it is sprayed against the walls of the combustion chamber (not shown) where it cools the combustion chamber walls. The remaining fuel travels out from the recirculation loops 26 where it enters the fuel elements 35 extending from the recirculation loops 26. From the fuel element 35, the fuel is ejected from the inner fuel outlets 16. Due to the configuration and alignment of the fuel elements 35 and tertiary oxidizer elements 34 the fuel and oxygen are ejected such that a fuel stream and oxygen stream combine outside the inject plate bottom face 7. This combined stream again combines with an adjacent combined fuel and oxygen stream at another point further beyond the injector plate bottom face 7. Subsequently, the fuel and oxygen composition is ignited inside the combustion chamber and thrust is exerted to the rocket engine.

The internal fuel and oxygen passages as described herein and as illustrated in FIG. 6, are extremely difficult if not impossible to manufacture without the use of 3-D printing, but with 3-D printing, the interlacing of the oxidizer and fuel passages internal to the injector plate as well as the smooth transitions, which reduce efficiency losses and turbulence, can be utilized as in the embodiments described, to produce rocket engine injector plates at more reasonable cost than in the past.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

The specification and drawings are to be regarded in an illustrative rather than a restrictive sense. It will, however, be evident that various modifications and changes may be made thereto without departing from the broader spirit and scope of the invention as set forth in the claims and that the invention is intended to cover all modifications and equivalents within the scope of the following claims.

What is claimed is:

1. An injector plate for a rocket engine assembly, the injector plate comprising:
    a body elongated along an axis between an entry end and an exit end, the exit end being configured to form a portion of a combustion chamber for the rocket engine assembly, the body having a mounting flange extending diametrically about the axis for connection to the rocket engine assembly,
    wherein the body has a fuel manifold comprising:
        a fuel passage ring encircling the axis and in fluid communication with a fuel inlet;
        a plurality of fuel recirculation passages, each one of said plurality of fuel recirculation passages extending between portions of the fuel passage ring;
        a plurality of fuel outlets at the exit end; and
        a plurality of fuel element passages, each one of said plurality of fuel element passages extending to a fuel outlet of the plurality of fuel outlets from the one of said plurality of recirculation passages;
    wherein the body has an oxidizer manifold comprising:
        a primary oxygen passage elongated along the axis between a primary oxidizer entrance at the entry end of an oxidizer body and an internal portion of the oxidizer body;
        a plurality of secondary oxygen passages branching from the primary oxygen passage at the internal portion of the oxidizer body to a plurality of oxidizer outlets at the exit end; and,
        a plurality of tertiary oxygen passages branching from each one of said secondary oxygen passages to the plurality of oxidizer outlets at the exit end,
    wherein the plurality of fuel outlets and the plurality of oxidizer outlets are arranged at the exit end to form a plurality of outer element groupings and a plurality of inner element groupings.

2. The injector plate for a rocket engine assembly of claim 1 wherein each one of the plurality of secondary oxygen passages branches into at least two of said plurality of tertiary oxygen passages extending from one of the secondary oxygen passages to the oxygen outlets.

3. The injector plate for a rocket engine assembly of claim 2, wherein the at least two tertiary oxygen passages extend parallel to the axis.

4. The injector plate for a rocket engine assembly of claim 1, further comprising a plurality of film cooling passages extending from the fuel passage ring to a plurality of cooling outlets at the exit end.

5. The injector plate for a rocket engine assembly of claim 1, wherein the plurality of oxidizer outlets and plurality of fuel element passages are arranged in a linear pattern to form a plurality of element groupings and wherein each of the plurality of element groupings comprises oxidizer and fuel outlets in the order of a fuel outlet, an oxidizer outlet, another oxidizer outlet and then another fuel outlet.

6. The injector plate for a rocket engine assembly of claim 5, wherein said plurality of element groupings includes an inner grouping and an outer grouping, each inner grouping comprises fuel outlets that extend from different ones of said plurality of fuel recirculation passages.

7. The injector plate for a rocket engine assembly of claim 6, wherein the fuel element passages extend toward the oxidizer outlets in the exit end direction at an angle of 40° with respect to the axis.

8. The injector plate for a rocket engine assembly of claim 7, wherein the fuel element passages extending to the outer element groupings extend from adjacent recirculation passages and the fuel element passages extending to the inner element groupings extend from a single recirculation passage.

9. The injector plate for a rocket engine assembly of claim 1, wherein the primary oxygen passage terminates in a curved shaped cup.

10. The injector plate for a rocket engine assembly of claim 1, wherein the fuel inlet is angled in the radial direction about the axis.

* * * * *